United States Patent
Fukudome et al.

(10) Patent No.: US 11,391,388 B2
(45) Date of Patent: Jul. 19, 2022

(54) CAPACITY CONTROL VALVE

(71) Applicant: Eagle Industry Co., Ltd., Tokyo (JP)

(72) Inventors: Kohei Fukudome, Tokyo (JP); Masahiro Hayama, Tokyo (JP); Keigo Shirafuji, Tokyo (JP); Takahiro Ejima, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 17/299,288

(22) PCT Filed: Dec. 3, 2019

(86) PCT No.: PCT/JP2019/047193
§ 371 (c)(1),
(2) Date: Jun. 2, 2021

(87) PCT Pub. No.: WO2020/116436
PCT Pub. Date: Jun. 11, 2020

(65) Prior Publication Data
US 2022/0003331 A1     Jan. 6, 2022

(30) Foreign Application Priority Data

Dec. 4, 2018   (JP) .............................. JP2018-227598

(51) Int. Cl.
*F16K 31/06*     (2006.01)
*F16K 11/10*     (2006.01)
*F04B 27/18*     (2006.01)

(52) U.S. Cl.
CPC .......... *F16K 31/0613* (2013.01); *F16K 11/10* (2013.01); *F04B 27/18* (2013.01)

(58) Field of Classification Search
CPC ...... F16K 31/0613; F16K 31/06; F16K 11/10; F16K 11/105; Y10T 137/86702;
(Continued)

(56) References Cited

U.S. PATENT DOCUMENTS

| 2,267,515 A | 12/1941 | Wilcox |
| 3,360,304 A | 12/1967 | Adams ..................... B61K 7/12 |

(Continued)

FOREIGN PATENT DOCUMENTS

| EP | 2 784 320 | 10/2014 | .............. F04B 27/18 |
| EP | 3 431 760 | 1/2019 | .............. F04B 27/18 |

(Continued)

OTHER PUBLICATIONS

International Search Report and Written Opinion issued in PCT/JP2020/026722, dated Sep. 29, 2020, with English translation, 11 pages.

(Continued)

*Primary Examiner* — Kelsey E Cary
(74) *Attorney, Agent, or Firm* — Hayes Soloway P.C.

(57) ABSTRACT

A capacity control valve includes: valve housings provided with a discharge port, a suction port, and a control port; and a main valve configured to open and close a communication between the discharge port and the control port as a rod driven by a solenoid moves. The capacity control valve further includes: a pressure drive unit disposed in a suction fluid supply chamber, operated by a suction pressure Ps, and coupled to the main valve body so as to be movable together; and a CS valve having a CS valve seat and a CS valve body to open and close a communication between the control port and the suction port. The CS valve body is movable relative to the main valve body. Upon the movement of the rod 83 in a closed state of the main valve, the main valve body and the CS valve body move together.

20 Claims, 7 Drawing Sheets

(58) Field of Classification Search
CPC .. F04B 27/18; F04B 27/0895; F04B 27/1009; F04B 27/1804
See application file for complete search history.

(56) References Cited

U.S. PATENT DOCUMENTS

| | | | |
|---|---|---|---|
| 4,579,145 A | 4/1986 | Lieber | F16H 61/0251 |
| 4,615,358 A | 10/1986 | Hammond | F15B 13/0402 |
| 4,917,150 A | 4/1990 | Koch | F16K 31/0606 |
| 4,979,542 A | 12/1990 | Mesenich | F02M 47/027 |
| 4,985,192 A | 1/1991 | Roeder et al. | F01M 11/04 |
| 4,998,559 A | 3/1991 | McAuliffe | F16H 61/0251 |
| 5,048,790 A | 9/1991 | Wells | F16K 31/383 |
| 5,060,695 A | 10/1991 | McCabe | G05D 16/2024 |
| 5,217,047 A | 6/1993 | McCabe | F16H 61/0251 |
| 5,286,172 A | 2/1994 | Taguchi | F04B 1/26 |
| 5,778,932 A | 7/1998 | Alexander | G05D 16/2024 |
| 6,161,585 A | 12/2000 | Kolchinsky | G05D 16/2024 |
| 6,354,811 B1 | 3/2002 | Ota et al. | 417/222.2 |
| 6,358,017 B1 | 3/2002 | Ota et al. | 417/222.2 |
| 6,361,283 B1 | 3/2002 | Ota et al. | 417/222.2 |
| 6,434,956 B1 | 8/2002 | Ota | 62/133 |
| 7,014,427 B1 | 3/2006 | Hirota | 417/218 |
| 8,021,124 B2 | 9/2011 | Umemura et al. | 417/222.2 |
| 8,225,818 B1 | 7/2012 | Stephens | F15B 13/0442 |
| 9,022,346 B2 | 5/2015 | Najmolhoda | F16K 31/0613 |
| 9,027,598 B2 | 5/2015 | Schneider | F16K 31/0613 |
| 9,453,518 B2 | 9/2016 | Schulz | F15B 13/043 |
| 2002/0134444 A1 | 9/2002 | Isobe | F16K 27/041 |
| 2004/0060604 A1 | 4/2004 | Uemura et al. | 137/595 |
| 2004/0120829 A1 | 6/2004 | Pitla et al. | F04B 1/26 |
| 2005/0076959 A1 | 4/2005 | Yamamoto | F16K 31/0624 |
| 2005/0265853 A1 | 12/2005 | Hirota | F04B 1/12 |
| 2006/0218953 A1 | 10/2006 | Hirota | 62/228.5 |
| 2009/0183786 A1 | 7/2009 | Iwa et al. | 137/487.5 |
| 2009/0256091 A1 | 10/2009 | Nordstrom | F16K 31/0613 |
| 2011/0089352 A1 | 4/2011 | Morgan | F16K 11/0716 |
| 2012/0198992 A1 | 8/2012 | Futakuchi et al. | 91/505 |
| 2014/0130916 A1* | 5/2014 | Saeki | F16K 31/0613 137/625.48 |
| 2015/0027573 A1 | 1/2015 | Ochiai | F15B 13/0402 |
| 2015/0044065 A1 | 2/2015 | Ota | F04B 27/18 |
| 2015/0044067 A1 | 2/2015 | Ota | F04B 27/1804 |
| 2015/0211506 A1 | 7/2015 | Shirafuji et al. | F04B 27/1804 |
| 2015/0345655 A1 | 12/2015 | Higashidozono et al. | F16K 31/0624 |
| 2017/0356430 A1 | 12/2017 | Irie et al. | F04B 27/1804 |
| 2018/0156345 A1 | 6/2018 | Kanda | F15B 13/0431 |
| 2021/0180715 A1 | 6/2021 | Hayama et al. | F16K 31/122 |

FOREIGN PATENT DOCUMENTS

| | | | | |
|---|---|---|---|---|
| JP | 5-306679 | 11/1993 | | F04B 27/08 |
| JP | 6-200875 | 7/1994 | | F04B 27/08 |
| JP | 3088536 | 7/2000 | | F04B 27/08 |
| JP | 2000-345961 | 12/2000 | | F04B 27/14 |
| JP | 2001-73939 | 3/2001 | | F04B 27/14 |
| JP | 2001-107854 | 4/2001 | | F04B 27/14 |
| JP | 2001-132632 | 5/2001 | | F04B 27/14 |
| JP | 3581598 | 7/2004 | | F04B 29/10 |
| JP | 2006-17035 | 1/2006 | | F04B 27/14 |
| JP | 2006-52648 | 2/2006 | | F04B 27/14 |
| JP | 2006-307828 | 11/2006 | | F04B 27/14 |
| JP | 4242624 | 1/2009 | | F04B 49/00 |
| JP | 4700048 | 3/2011 | | F04B 49/00 |
| JP | 5167121 | 12/2012 | | F04B 27/14 |
| JP | 5557901 | 6/2014 | | F04B 27/14 |
| JP | 2014-190247 | 10/2014 | | F04B 27/14 |
| JP | 2015-34509 | 2/2015 | | F04B 27/14 |
| JP | 2015-34510 | 2/2015 | | F04B 27/14 |
| JP | 2017-129042 | 7/2017 | | F04B 27/18 |
| JP | 6206274 | 10/2017 | | F04B 27/18 |
| JP | 2017-223348 | 12/2017 | | F16K 11/10 |
| JP | 2018-021646 | 2/2018 | | F04B 27/18 |
| JP | 2018-40385 | 3/2018 | | F16K 31/06 |
| JP | 2018-145877 | 9/2018 | | F04B 27/12 |
| WO | WO 2007119380 | 10/2007 | | F04B 27/14 |
| WO | WO2013109005 | 7/2013 | | F04B 27/14 |
| WO | WO2014091975 | 6/2014 | | F04B 27/14 |
| WO | WO 2014119594 | 8/2014 | | F04B 27/14 |
| WO | WO2017057160 | 4/2017 | | F04B 27/18 |
| WO | WO 2017057160 | 4/2017 | | F04B 27/18 |
| WO | WO 2017159553 | 9/2017 | | F04B 27/18 |
| WO | WO2018207461 | 11/2018 | | F04B 27/18 |
| WO | WO2019131703 | 7/2019 | | F04B 27/18 |
| WO | WO2019167912 | 2/2021 | | F04B 27/18 |

OTHER PUBLICATIONS

International Preliminary Report on Patentability issued in PCT/JP2020/026722, dated Jan. 20, 2022, 5 pages.
International Search Report and Written Opinion issued in PCT/JP2020/026723, dated Sep. 8, 2020, with English translation, 11 pages.
International Preliminary Report on Patentability issued in PCT/JP2019/026723, dated Jan. 18, 2022, 4 pages.
Chinese Official Action issued in related Chinese Official Action dated Dec. 1, 2021 with English Translation, 7 pages.
International Search Report and Written Opinion issued in PCT/JP2019/002207, dated Apr. 23, 2019, with English translation, 13 pages.
International Preliminary Report on Patentability issued in PCT/JP2019/002207, dated Jul. 28, 2020, 7 pages.
International Search Report and Written Opinion issued in PCT/JP2019/005200, dated Apr. 23, 2019, with English translation, 12 pages.
International Preliminary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Preliminary Report on Patentability issued in PCT/JP2019/007187, Sep. 3, 2020, 8 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.

(56) References Cited

OTHER PUBLICATIONS

International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
Notice of Allowance issued in related U.S. Appl. No. 17/056,988, dated Oct. 27, 2021 13 pages.
International Preliminary Report on Patentability issued in PCT/JP2019/020196, dated Nov. 24, 2020, with English translation, 6 pages.
International Search Report and Written Opinion issued in PCT/JP2019/020196, dated Aug. 27, 2019, with English translation, 11 pages.
International Preliminary Report on Patentability issued in PCT/JP2019/047193, dated Dec. 3, 2021, with English translation, 6 pages.
International Search Report and Written Opinion issued in PCT/JP2019/047193, dated Aug. 27, 2019, with English translation, 11 pages.

* cited by examiner

CAPACITY CONTROL VALVE

TECHNICAL FIELD

The present invention relates to a capacity control valve that variably controls the capacity of a working fluid, for example, to a capacity control valve that controls the discharge amount of a variable displacement compressor, which is used in an air conditioning system of an automobile, according to pressure.

BACKGROUND ART

A variable displacement compressor used in an air conditioning system of an automobile or the like includes a rotary shaft that is rotationally driven by an engine; a swash plate that is coupled to the rotary shaft such that the inclination angle of the swash plate with respect thereto is variable; a piston for compression coupled to the swash plate; and the like. When the inclination angle of the swash plate is changed, the stroke amount of the piston is changed to control the discharge amount of a fluid. The capacity control valve, of which the opening and closing is driven by electromagnetic force, appropriately controls the internal pressure of a control chamber while using a suction pressure Ps of a suction chamber that suctions the fluid, a discharge pressure Pd of a discharge chamber that discharges the fluid pressurized by the piston, and a control pressure Pc of the control chamber that accommodates the swash plate, so that the inclination angle of the swash plate can be continuously changed.

During continuous driving of the variable displacement compressor, the capacity control valve performs normal control where a valve body is moved in an axial direction by electromagnetic force which is generated in a solenoid when energization is controlled by a control computer, so that a main valve is opened and closed to adjust the control pressure Pc of the control chamber of the variable displacement compressor.

During normal control of the capacity control valve, the pressure of the control chamber in the variable displacement compressor is appropriately controlled and the inclination angle of the swash plate with respect to the rotary shaft is continuously changed, so that the stroke amount of the piston is changed to control the discharge amount of the fluid to the discharge chamber; and thereby, the cooling capacity of the air conditioning system is adjusted to a desired cooling capacity. In addition, when the variable displacement compressor is driven at the maximum capacity, the main valve of the capacity control valve is closed to lower the pressure of the control chamber, so that the inclination angle of the swash plate is maximized.

In addition, there is known a configuration where an auxiliary communication passage through which a control port and a suction port of the capacity control valve communicate with each other is formed, and a refrigerant of the control chamber of the variable displacement compressor during startup is discharged to the suction chamber of the variable displacement compressor through the control port, the auxiliary communication passage, and the suction port to quickly lower the pressure of the control chamber during startup; and thereby, the responsiveness of the variable displacement compressor is improved (refer to Patent Citation 1).

CITATION LIST

Patent Literature

Patent Citation 1: JP 5167121 B2 (page 7 and FIG. 2)

SUMMARY OF INVENTION

Technical Problem

However, according to Patent Citation 1, since the fluid discharge function during startup is good but the auxiliary communication passage is always in communication, during continuous driving of the variable displacement compressor, the refrigerant flows from the control port into the suction port via the auxiliary communication passage, and thus the compression efficiency is deteriorated, which is a problem.

The invention has been made in light of such a problem, and an object of the invention is to provide a capacity control valve having a good fluid discharge function during startup and a high compression efficiency.

Solution to Problem

In order to solve the foregoing problem, according to the present invention, there is provided a capacity control valve including: a valve housing provided with a discharge port through which a discharge fluid at a discharge pressure passes, a suction port through which a suction fluid at a suction pressure passes, and a control port through which a control fluid at a control pressure passes; a rod driven by a solenoid; and a main valve that includes a main valve seat and a main valve body to open and close a communication between the discharge port and the control port in accordance with a movement of the rod. The capacity control valve further includes: a pressure drive unit disposed in a suction fluid supply chamber which is formed in the valve housing and to which the suction fluid is supplied, the pressure drive unit being operated by the suction pressure and coupled to the main valve body so as to be movable together; and a CS valve that includes a CS valve seat and a CS valve body to open and close a communication between the control port and the suction port, the CS valve body being disposed so as to be movable relative to the main valve body. Upon the movement of the rod in a closed state of the main valve, the main valve body and the CS valve body move together. According to the aforesaid feature of the present invention, since the main valve body is disposed so as to be movable relative to the CS valve body, during normal control, the opening and closing of the main valve can be controlled in a state where the CS valve is closed, and in a maximum energized state, as the rod moves while the closed state of the main valve is maintained, the main valve body moves together with the CS valve body to open the CS valve and to cause the control port and the suction port to communicate with each other, so that the control pressure can be lowered. Therefore, the capacity control valve having a good fluid discharge function during startup and a high compression efficiency can be provided. In addition, during startup, normal control, or the like, when the suction pressure in the suction fluid supply chamber is high, since the pressure drive unit can be operated to assist the driving force of the solenoid, the capacity control valve having a stable fluid discharge function and compression performance during startup can be provided.

It may be preferable that the CS valve body is externally fitted to the main valve body, and the main valve seat is formed in an inner diameter portion of the CS valve body. According to this preferable configuration, since the main valve body is inserted into the CS valve body, the capacity control valve including the CS valve can be compactly configured, and the main valve body can move together with the CS valve body while a closed state of the main valve is reliably maintained.

It may be preferable that the main valve seat is formed at one end of the CS valve body, and the CS valve seat is formed on an outer diameter side of the main valve seat. According to this preferable configuration, since the main valve seat is formed in the inner diameter portion of one end of the CS valve body, and the CS valve seat is formed on the outer diameter side of the main valve seat, switching between the flow passages by the opening and closing of the main valve and the CS valve can be smoothly performed, and thus the responsiveness is good.

It may be preferable that the CS valve body is biased in a valve closing direction of the CS valve by biasing means. According to this preferable configuration, since the CS valve body can reliably move to a closed valve position, the capacity control valve can immediately return from a maximum energized state to normal control.

It may be preferable that the control fluid from the control port is introduced to a first end side and a second end side of the CS valve body in an axial direction. According to this preferable configuration, since the control pressures are applied to the CS valve body from both end sides, the CS valve body can move together with the main valve body in a state where the influence of the pressures is suppressed; and thereby, the valve body can be precisely controlled according to a current applied to the solenoid.

It may be preferable that the control fluid from the control port is introduced to the first end side of the CS valve body, and the control fluid from the control port is introduced to the second end side of the CS valve body via a supply passage formed in the main valve body. According to this preferable configuration, with a simple configuration, the control pressures can be applied to the CS valve body from both end sides.

It may be preferable that effective areas of both end portions of the CS valve body are equal. According to this preferable configuration, since the control pressures applied to both end portions of the CS valve body are cancelled out, the valve body can be more precisely controlled.

It may be preferable that the suction fluid supply chamber is partitioned inside the valve housing by a seal member that is externally fitted to the main valve body so as to be slidable. According to this preferable configuration, since the suction fluid supply chamber can be partitioned by the seal member and the main valve body, the suction pressure can be reliably applied to the pressure drive unit.

DESCRIPTION OF EMBODIMENTS

A mode for implementing a capacity control valve according to the invention will be described below based on an embodiment.

Embodiment

A capacity control valve according to an embodiment will be described with reference to FIGS. 1 to 7. In the following description, right and left sides of FIG. 2 as viewed from a front side are right and left sides of the capacity control valve.

A capacity control valve V of the invention is assembled into a variable displacement compressor M used in an air conditioning system of an automobile or the like to variably control the pressure of a working fluid (hereinafter, simply referred to as a "fluid") which is a refrigerant, so that the discharge amount of the variable displacement compressor M is controlled to adjust the cooling capacity of the air conditioning system to a desired cooling capacity.

Figure 1:
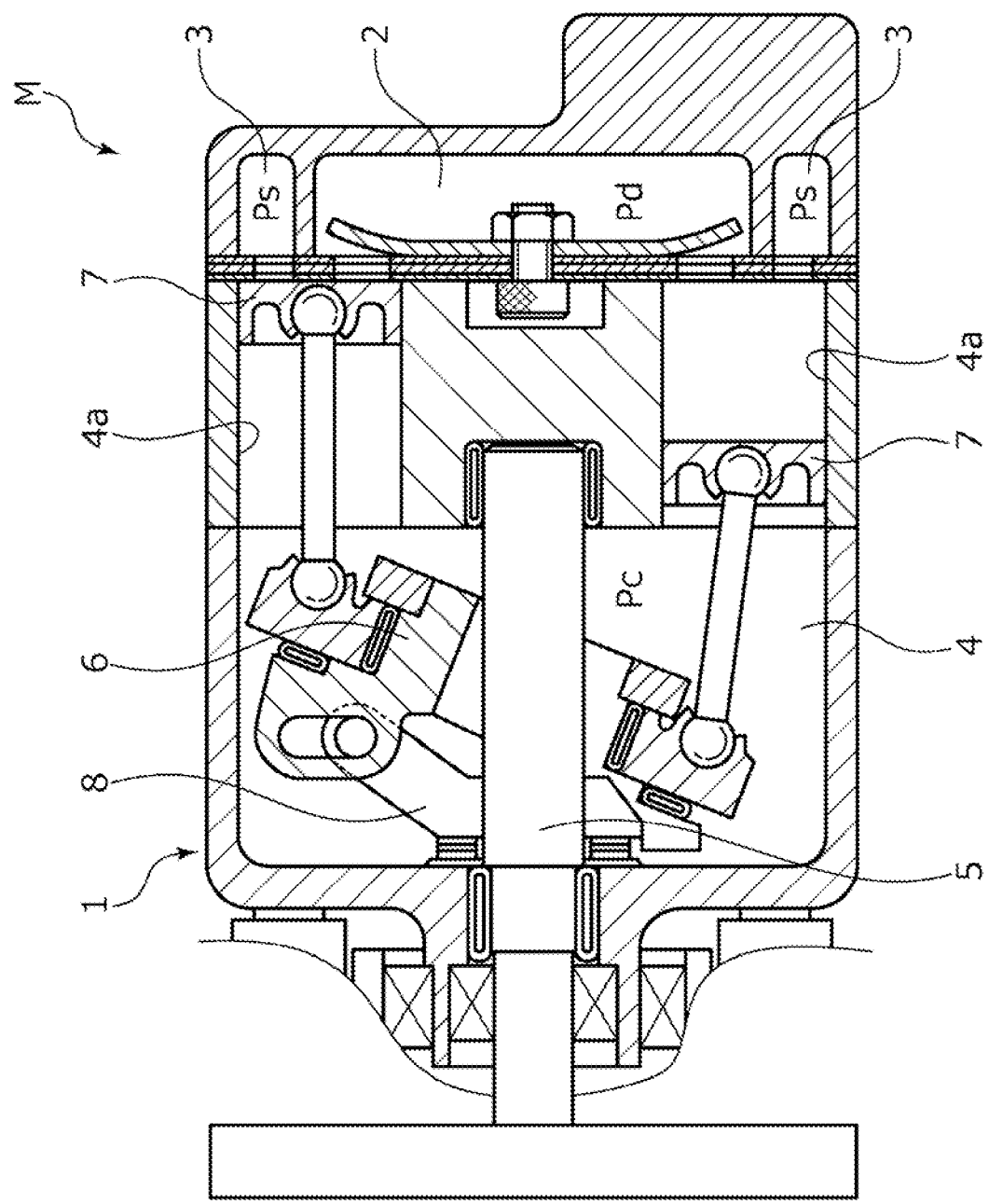
FIG. 1 is a schematic configuration view illustrating a swash plate-type variable displacement compressor into which a capacity control valve according to an embodiment of the invention is assembled.

First, the variable displacement compressor M will be described. As illustrated in FIG. 1, the variable displacement compressor M includes a casing 1 including a discharge chamber 2, a suction chamber 3, a control chamber 4, and a plurality of cylinders 4a. Incidentally, the variable displacement compressor M is provided with a communication passage (unillustrated) through which the control chamber 4 and the suction chamber 3 communicate directly with each other, and the communication passage is provided with a fixed orifice that balances the pressures of the suction chamber 3 and the control chamber 4.

In addition, the variable displacement compressor M includes a rotary shaft 5 that is rotationally driven by an engine (unillustrated) installed outside the casing 1; a swash plate 6 that is eccentrically coupled to the rotary shaft 5 by a hinge mechanism 8 in the control chamber 4; and a plurality of pistons 7 that are coupled to the swash plate 6 and are reciprocatably fitted into the cylinders 4a. The capacity control valve V, of which the opening and closing is driven by electromagnetic force, appropriately controls the internal pressure of the control chamber 4 while using a suction pressure Ps of the suction chamber 3 that suctions the fluid, a discharge pressure Pd of the discharge chamber 2 that discharges the fluid pressurized by the pistons 7, and a control pressure Pc of the control chamber 4 that accommodates the swash plate 6, so that the inclination angle of the swash plate 6 is continuously changed; and thereby, the stroke amounts of the pistons 7 are changed to control the discharge amount of the fluid. Incidentally, for convenience of description, in FIG. 1, the capacity control valve V that is assembled into the variable displacement compressor M is unillustrated.

Specifically, the higher the control pressure Pc in the control chamber 4, the smaller the inclination angle of the swash plate 6 with respect to the rotary shaft 5, and thus the stroke amounts of the pistons 7 are reduced, and when the control pressure Pc is a certain pressure or higher, the swash plate 6 is substantially perpendicular to the rotary shaft 5, namely, is slightly inclined with respect to perpendicularity. In this case, since the stroke amounts of the pistons 7 are minimized and the pressurization of the fluid in the cylinders 4a by the pistons 7 is minimized, the discharge amount of the fluid to the discharge chamber 2 is reduced, and the cooling capacity of the air conditioning system is minimized. On the other hand, the lower the control pressure Pc in the control chamber 4, the larger the inclination angle of the swash plate 6 with respect to the rotary shaft 5, and thus the stroke amounts of the pistons 7 are increased, and when the control pressure Pc is a certain pressure or lower, the inclination angle of the swash plate 6 with respect to the rotary shaft 5 is maximized. In this case, since the stroke amounts of the pistons 7 are maximized and the pressurization of the fluid in the cylinders 4a by the pistons 7 is maximized, the discharge amount of the fluid to the discharge chamber 2 is increased, and the cooling capacity of the air conditioning system is maximized.

Figure 2:
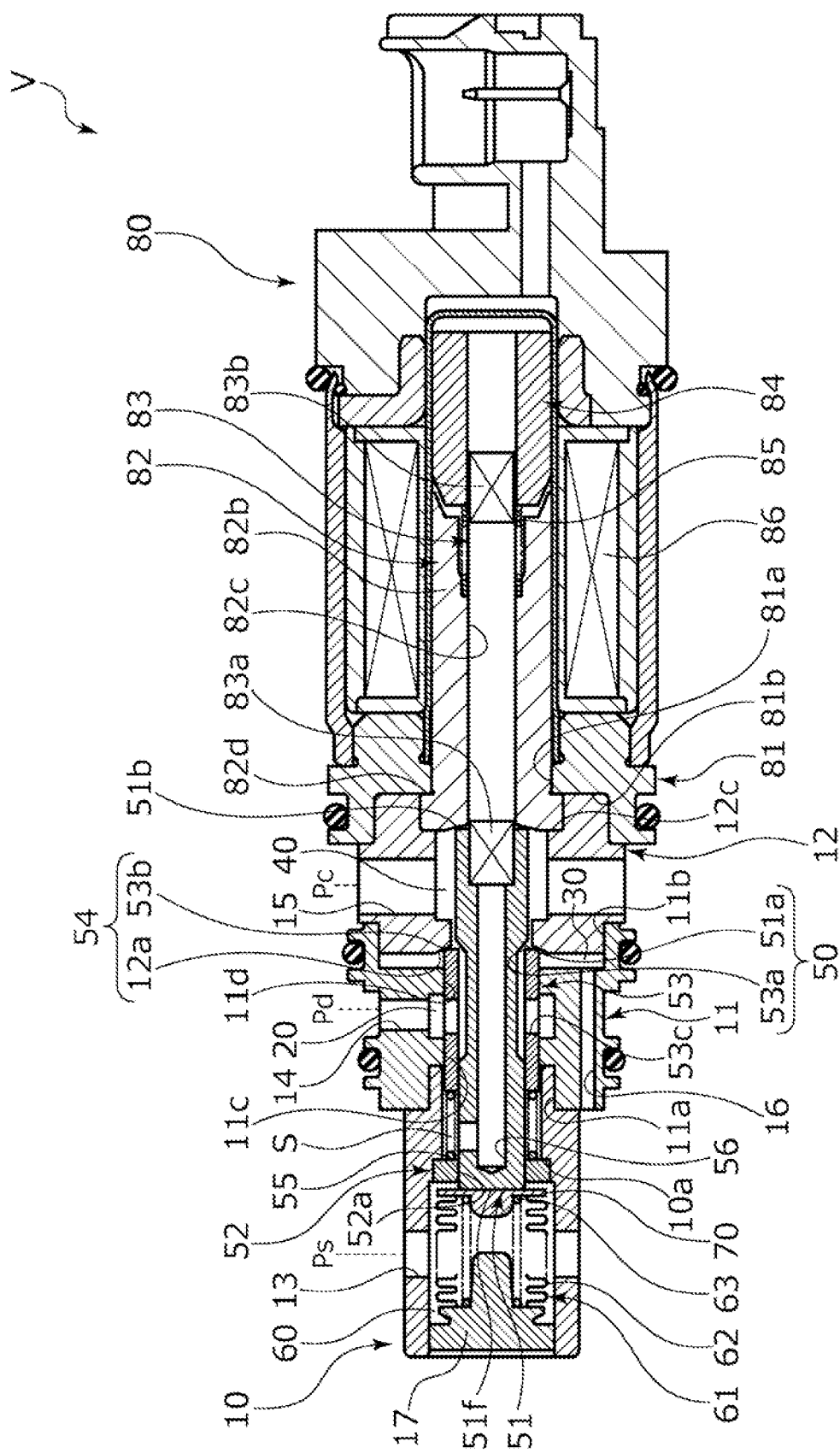
FIG. 2 is a cross-sectional view illustrating a state where a main valve is opened and a CS valve is closed when the capacity control valve according to the embodiment is in a de-energized state.

As illustrated in FIG. 2, in the capacity control valve V assembled into the variable displacement compressor M, a current with which a coil 86 forming a solenoid 80 is to be energized is adjusted to control the opening and closing of a main valve 50 and a CS valve 54 in the capacity control valve V, namely, the opening and closing of valves that open and close communication between a control port and a suction port, and a pressure sensitive body 61 as a pressure drive unit is operated by the suction pressure Ps in a pressure sensitive chamber 60 as a suction fluid supply chamber, so that the fluid flowing into the control chamber 4 or flowing out from the control chamber 4 is controlled; and thereby, the control pressure Pc in the control chamber 4 is variably controlled.

In the present embodiment, the main valve 50 includes a main valve body 51 and a main valve seat 53a that is formed in an inner diameter portion of a right axial end which is one end of a CS valve body 53, and a step portion 51a that is formed at substantially the center in the axial direction of the main valve body 51 comes into contact with and separates from the main valve seat 53a to open and close the main valve 50. The CS valve 54 includes the CS valve body 53 and a CS valve seat 12a that is formed in an inner diameter portion of a left axial end of a third valve housing 12 as a valve housing, and an outer diameter portion 53b of a right axial end that is one end of the CS valve body 53 comes into contact with and separates from the CS valve seat 12a to open and close the CS valve 54.

Next, the structure of the capacity control valve V will be described. As illustrated in FIG. 2, the capacity control valve V mainly includes a first valve housing 10, the second valve housing 11, and the third valve housing 12 as the valve housing made of a metallic material or a resin material; the main valve body 51 and the CS valve body 53 that are disposed in the first valve housing 10, the second valve housing 11, and the third valve housing 12 so as to be reciprocatable in the axial direction; the pressure sensitive body 61 that applies axial biasing force to the main valve body 51 and the CS valve body 53 according to the suction pressure Ps in the pressure sensitive chamber 60; and the solenoid 80 that is connected to the third valve housing 12 to apply driving force to the main valve body 51 and the CS valve body 53.

As illustrated in FIG. 2, the solenoid 80 mainly includes a casing 81 having an opening portion 81a that is open leftward in the axial direction; a fixed core 82 that has a substantially cylindrical shape and is inserted into the opening portion 81a of the casing 81 from the left in the axial direction to be fixed to an inner diameter side of the casing 81; a drive rod 83 as a rod which is inserted into the fixed core 82 to be reciprocatable in the axial direction and of which a left axial end portion 83a is inserted into and fixed to the main valve body 51; a movable core 84 to which a right axial end portion 83b of the drive rod 83 is inserted into and fixed; a coil spring 85 that is provided between the fixed core 82 and the movable core 84 to bias the movable core 84 rightward in the axial direction, namely, a valve opening direction of the main valve 50; and the coil 86 for excitation that is wound around the outside of the fixed core 82 via a bobbin.

An inner diameter side of a left axial end of the casing 81 is recessed rightward in the axial direction to form a recessed portion 81b, and a right axial end portion of the third valve housing 12 is inserted into and fixed to the recessed portion 81b in a substantially sealed manner.

The fixed core 82 is formed of a rigid body made of a magnetic material such as iron or silicon steel, and includes a cylindrical portion 82b provided with an insertion hole 82c into which the drive rod 83 extending in the axial direction is inserted, and a flange portion 82d that has an annular shape and extends outward in a radial direction from an outer peripheral surface of a left axial end portion of the cylindrical portion 82b.

In addition, the fixed core 82 is inserted into and fixed to a recessed portion 12c in a substantially sealed manner in a state where a right axial end surface of the flange portion 82d is in contact with a bottom surface of the recessed portion 81b of the casing 81 from the left in the axial direction, and the recessed portion 12c is formed by recessing an inner diameter side of a right axial end of the third valve housing 12, which is inserted into and fixed to the recessed portion 81b of the casing 81, leftward in the axial direction.

The drive rod 83 is formed in a columnar shape, and the left axial end portion 83a of the drive rod 83 which is inserted into and fixed to the main valve body 51 and the right axial end portion 83b of the drive rod 83 which is inserted into and fixed to the movable core 84 have a plate shape.

As illustrated in FIG. 2, the first valve housing 10 is provided with a Ps port 13 as suction port communicating with the suction chamber 3 of the variable displacement compressor M. In addition, the second valve housing 11 is provided with a Pd port 14 as a discharge port communicating with the discharge chamber 2 of the variable displacement compressor M, and a Ps communication passage 16 communicating with the suction chamber 3 of the variable displacement compressor M. In addition, the third valve housing 12 is provided with a Pc port 15 as a control port communicating with the control chamber 4 of the variable displacement compressor M.

In addition, a right axial end portion of the first valve housing 10 is inserted into a recessed portion 11a, which is formed by recessing a left axial end of the second valve housing 11 rightward in the axial direction, from the left in the axial direction so that the first valve housing 10 is integrally connected and fixed to the second valve housing 11 in a substantially sealed state. In addition, a partition adjustment member 17 is press-fitted into a left axial end portion of the first valve housing 10 in a substantially sealed manner, so that the first valve housing 10 has a substantially bottomed cylindrical shape. Incidentally, the partition adjustment member 17 can adjust the installation position in the axial direction of the first valve housing 10 to adjust the biasing force of the pressure sensitive body 61.

In addition, inside the first valve housing 10, a seal member 52 having an annular shape is press-fitted into a step portion 10a, which is formed in an inner peripheral surface of the right axial end portion of the first valve housing 10, in a substantially sealed manner, and a left axial end portion of the main valve body 51 is slidably inserted into a shaft hole 52a of the seal member 52, so that the pressure sensitive chamber 60 which communicates with the Ps port 13 and in which the pressure sensitive body 61 is disposed is formed on a left side in the axial direction of the seal member 52. In addition, a space S in which a coil spring 55 as biasing means and a left axial end that is the other end of the CS valve body 53 are disposed is formed on a right side in the axial direction of the seal member 52. Namely, the pressure sensitive chamber 60 and the space S are partitioned off from each other in a substantially sealed manner by the seal member 52.

A right axial end of the second valve housing 11 is recessed leftward in the axial direction to form a recessed portion 11b, and a left axial end portion of the third valve housing 12 is inserted into the recessed portion 11b from the right in the axial direction, so that the second valve housing 11 is integrally connected and fixed to the third valve housing 12 in a substantially sealed state.

In addition, inside the second valve housing 11, a first valve chamber 20 which communicates with the Pd port 14 and in which a Pd communication hole 53c penetrating through the CS valve body 53 in the radial direction is disposed is formed, and a second valve chamber 30 which communicates with the Ps communication passage 16 and a right axial end portion that is one end portion of the CS valve body 53 is disposed is formed by an inner peripheral surface of the recessed portion 11b of the second valve housing 11 and a left axial end surface of the third valve housing 12. In addition, a third valve chamber 40 which communicates with the Pc port 15 and in which a large diameter portion 51c (refer to FIGS. 4 to 6) on a right axial end side of the main valve body 51 is disposed is formed inside the third valve housing 12.

In addition, the main valve body 51 and the CS valve body 53 are disposed in the first valve housing 10, the second valve housing 11, and the third valve housing 12 so as to be reciprocatable in the axial direction, and guide holes 11c and 11d which have small diameters and against which an outer peripheral surface of the CS valve body 53 is slidable in a substantially sealed state are formed at substantially the center in the axial direction of an inner peripheral surface of the second valve housing 11. Incidentally, the inner diameters of the guide holes 11c and 11d of the second valve housing 11 are substantially equal. In addition, a shaft hole 12b into which the large diameter portion 51c of the main valve body 51 is inserted is formed in a left axial end portion of an inner peripheral surface of the third valve housing 12. Furthermore, the CS valve seat 12a with which the outer diameter portion 53b of the right axial end of the CS valve body 53 can come into contact is formed in an inner diameter portion of a left axial end of the third valve housing 12.

Inside the second valve housing 11, the first valve chamber 20 and the second valve chamber 30 are partitioned off from each other by the outer peripheral surface of the CS valve body 53 and an inner peripheral surface of the guide hole 11d, and the first valve chamber 20 and the space S are partitioned off from each other by the outer peripheral surface of the CS valve body 53 and an inner peripheral surface of the guide hole 11c. Incidentally, the inner peripheral surfaces of the guide holes 11c and 11d and the outer peripheral surface of the CS valve body 53 are slightly separated from each other in the radial direction to form very small gaps therebetween, and the CS valve body 53 is smoothly movable relative to the second valve housing 11 in the axial direction.

Figure 3:
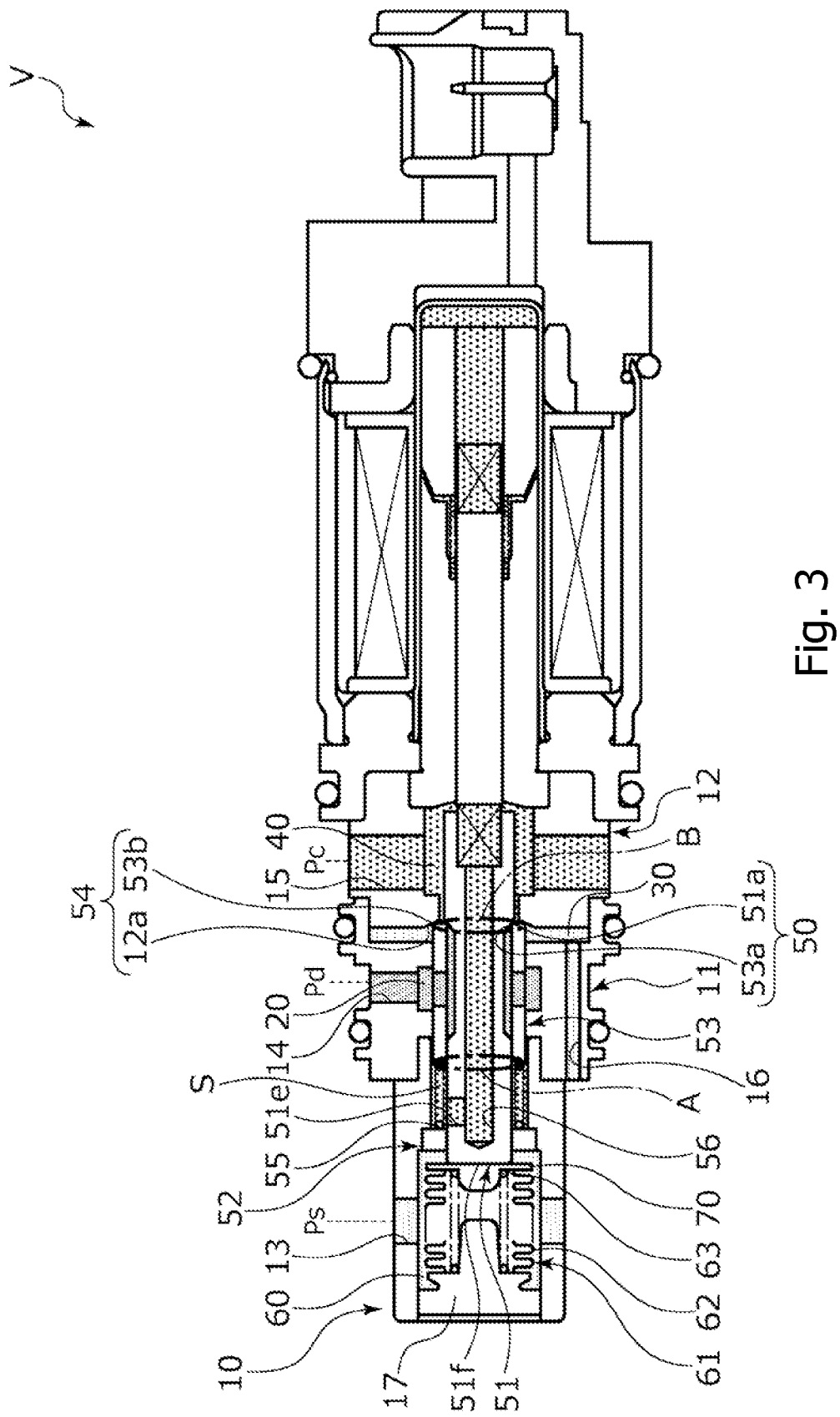
FIG. 3 is a cross-sectional view illustrating a pressure distribution when the main valve and the CS valve are closed in an energized state (during normal control) of the capacity control valve according to the embodiment. Incidentally, in order to illustrate the pressure distribution, the cross section of each member is unillustrated.
Figure 4:
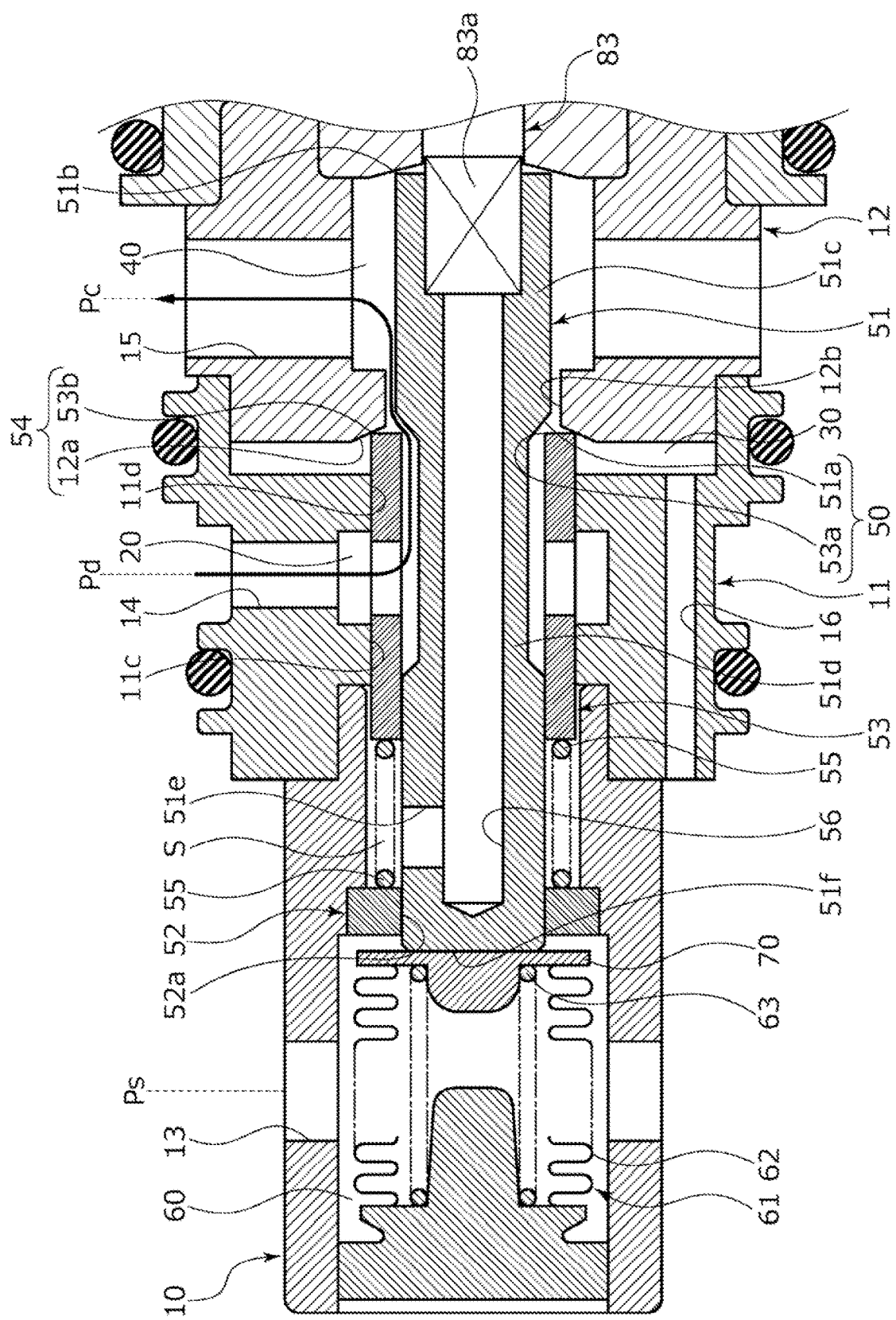
FIG. 4 is an enlarged cross-sectional view of FIG. 2 illustrating a state where the main valve is opened and the CS valve is closed when the capacity control valve according to the embodiment is in a de-energized state.
Figure 5:
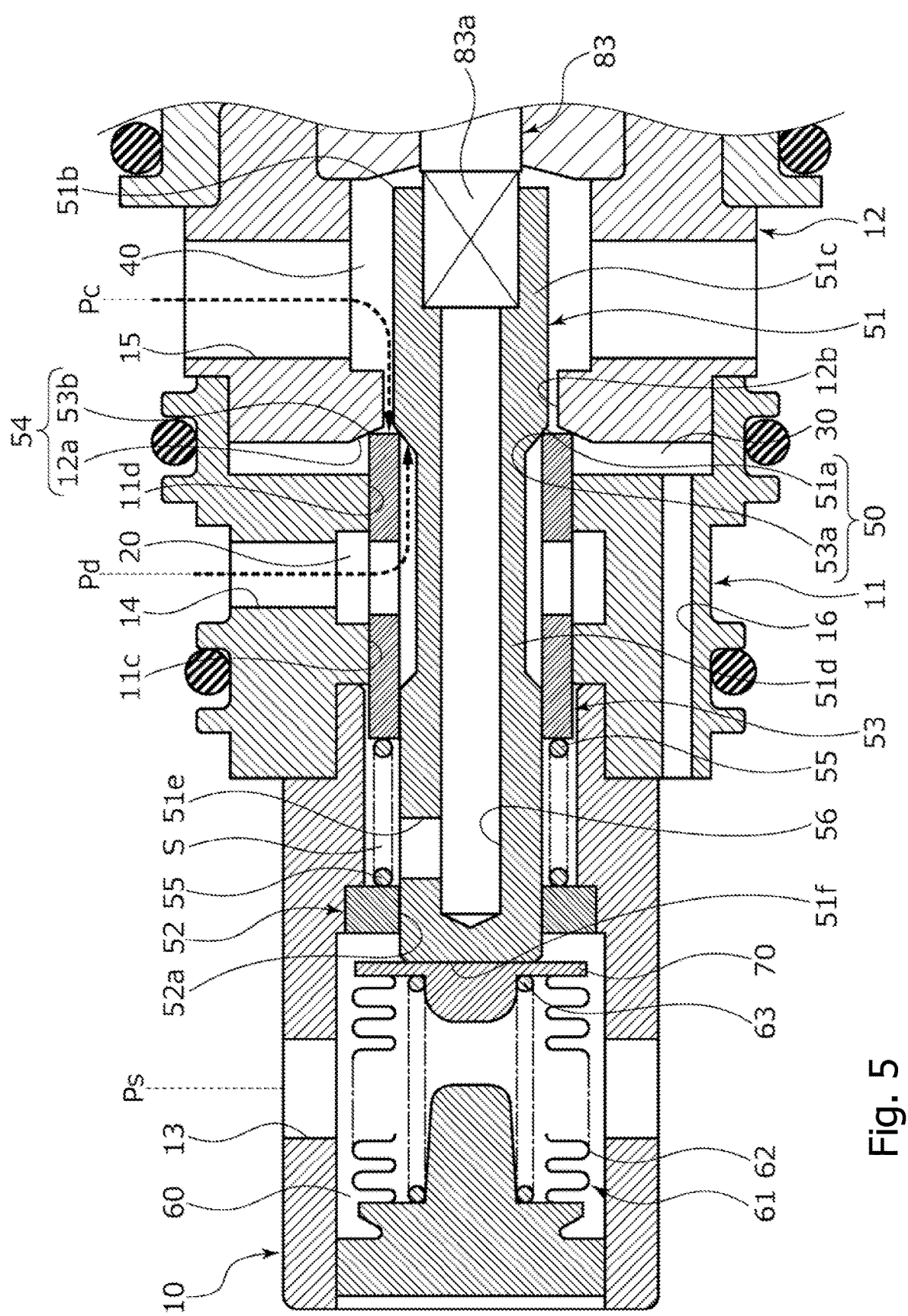
FIG. 5 is an enlarged cross-sectional view illustrating a state where the main valve and the CS valve are closed when the capacity control valve according to the embodiment is in an energized state (e.g., during normal control).

In addition, the third valve chamber 40 can communicate with the first valve chamber 20 or the second valve chamber 30 via a gap that is formed in the radial direction between an inner peripheral surface of the shaft hole 12b of the left axial end portion of the third valve housing 12 and an outer peripheral surface of the large diameter portion 51c of the main valve body 51. In more details, as illustrated in FIGS. 2 and 4, when the main valve 50 is opened and the CS valve 54 is closed, the first valve chamber 20 and the third valve chamber 40 communicate with each other, and the third valve chamber 40 and the second valve chamber 30 are isolated from each other. In addition, as illustrated in FIGS. 3 and 5, when the main valve 50 and the CS valve 54 are closed, the first valve chamber 20 and the third valve chamber 40 are isolated from each other, and the third valve chamber 40 and the second valve chamber 30 are isolated from each other. In addition, as illustrated in FIG. 6, when the main valve 50 is closed and the CS valve 54 is opened, the first valve chamber 20 and the third valve chamber 40 are isolated from each other, and the third valve chamber 40 and the second valve chamber 30 communicate with each other.

Figure 6:
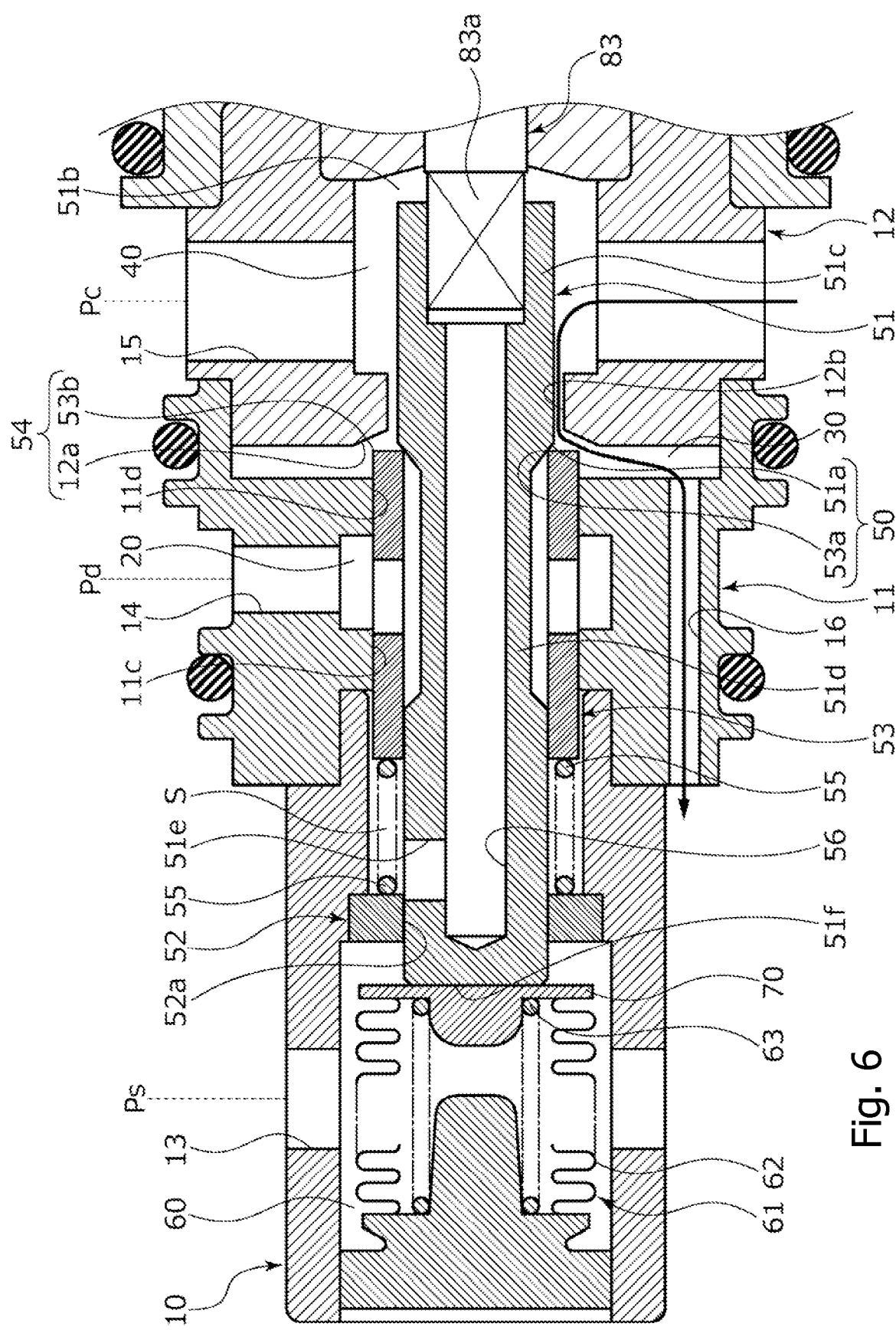
FIG. 6 is an enlarged cross-sectional view illustrating a state where the main valve is closed and the CS valve is opened when the capacity control valve according to the embodiment is in an energized state (e.g., maximum energized state).

As illustrated in FIGS. 4 to 6, the main valve body 51 is formed in a substantially stepped cylindrical shape, and includes the large diameter portion 51c that is inserted into the shaft hole 12b of the third valve housing 12, and a small diameter portion 51d that is formed on a left side in the axial direction of the large diameter portion 51c to have a smaller diameter than the large diameter portion 51c and to which the CS valve body 53 formed in a cylindrical shape is externally fitted in a substantially sealed manner. Incidentally, the left axial end portion 83a of the movable core 83 forming the solenoid 80 is inserted into and fixed to a right axial end portion of the main valve body 51, namely, a right axial end portion of the large diameter portion 51c, so that the drive rod 83 and the main valve body 51 are movable together in the axial direction. In addition, a supply passage 56 extending from a right axial end to the left axial end portion in the axial direction is formed inside the main valve body 51, and the supply passage 56 communicates with the space S via a through-hole 51e that penetrates through a left axial end portion of the small diameter portion 51d in the radial direction. Incidentally, the supply passage 56 is closed at a left axial end of the main valve body 51.

In addition, since the left axial end portion 83a having a plate shape of the drive rod 83 is inserted into and fixed to the right axial end portion of the large diameter portion 51c of the main valve body 51, and a right axial end 51b in contact with the left axial end of the fixed core 82 is provided with a slit or the like (unillustrated), a plate surface of the left axial end portion 83a of the drive rod 83 and an inner peripheral surface of the large diameter portion 51c of the main valve body 51 communicate with each other, and the fluid always flows from the third valve chamber 40 to the supply passage 56.

In addition, the step portion 51a that is formed at substantially the center in the axial direction of the main valve body 51, namely, a left axial end of the large diameter portion 51c is formed in a tapered shape that is tapered toward the left in the axial direction where the small diameter portion 51d is formed, and comes into contact with and separates from the main valve seat 53a that is formed in the inner diameter portion of the right axial end of the CS valve body 53.

In addition, since the small diameter portion 51d of the main valve body 51 is formed in a constricted shape where an outer peripheral surface is recessed toward an inner diameter side from a right axial end portion to substantially the center in the axial direction, when the main valve 50 is opened, a Pd-Pc flow passage (illustrated by a solid arrow in FIG. 4) with a large flow passage area from the Pd port 14 to the Pc port 15 can be secured.

As illustrated in FIGS. 4 to 6, a coil spring 55 is externally fitted to the left axial end portion of the small diameter portion 51d of the main valve body 51. A left axial end of the coil spring 55 is in contact with a right surface in the axial direction of the seal member 52, and a right axial end of the coil spring 55 is in contact with the left axial end that is the other end of the CS valve body 53. Incidentally, the coil spring 55 applies biasing force toward the right in the axial direction, namely, in a valve closing direction of the CS valve 54 such that the outer diameter portion 53b of the right axial end which is one end of the CS valve body 53 comes into contact with the CS valve seat 12a formed in the inner diameter portion of the left axial end of the third valve housing 12. In addition, the coil spring 55 is set to have a smaller spring constant than a coil spring 63 provided in the pressure sensitive body 61.

As illustrated in FIGS. 2 to 6, the pressure sensitive body 61 mainly includes a bellows core 62 where the coil spring 63 is built in, and an adapter 70 which has a disk shape and is provided at a right axial end of the bellows core 62, and a left axial end of the bellows core 62 is fixed to the partition adjustment member 17.

In addition, the pressure sensitive body 61 is disposed in the pressure sensitive chamber 60, and a right axial end of the adapter 70 is coupled and fixed to a left axial end 51f of the main valve body 51. Namely, the leftward axial driving force of the solenoid 80 is applied to the pressure sensitive body 61 via the drive rod 83 and the main valve body 51, and axial biasing from the pressure sensitive body 61 according to the suction pressure Ps in the pressure sensitive chamber 60 is applied to the drive rod 83 and the main valve body 51.

Here, a pressure distribution in the capacity control valve V will be described with reference to FIG. 3. Incidentally, FIG. 3 illustrates a state where the main valve 50 and the CS valve 54 are closed when the capacity control valve V in an energized state (e.g., during normal control). As illustrated in FIG. 3, the control pressure Pc introduced from the Pc port 15 is distributed from the third valve chamber 40 to a right side in the axial direction of the main valve 50 closed and an inner diameter side of the CS valve 54 closed, via the gap that is formed in the radial direction between the inner peripheral surface of the shaft hole 12b of the third valve housing 12 and the outer peripheral surface of the large diameter portion 51c of the main valve body 51, and is distributed to the space S via the supply passage 56 and the through-hole 51e that are formed in the main valve body 51.

In addition, the suction pressure Ps introduced from the Ps communication passage 16 is distributed to an outer diameter side of the CS valve 54 closed in the second valve chamber 30. In addition, the discharge pressure Pd introduced from the Pd port 14 is distributed from the first valve chamber 20 to a left side in the axial direction of the main valve 50 closed, via the Pd communication hole 53c of the CS valve body 53 and a gap that is formed in the radial direction between an inner peripheral surface of the CS valve body 53 and an outer peripheral surface of the main valve body 51. In addition, the suction pressure Ps introduced from the Ps port 13 is distributed in the pressure sensitive chamber 60.

Next, an operation of the capacity control valve V, mainly, an opening and closing operation of the main valve 50 and the CS valve 54 will be described.

First, a de-energized state of the capacity control valve V will be described. As illustrated in FIGS. 2 and 4, when the capacity control valve V is in a de-energized state, since the movable core 84 is pressed rightward in the axial direction by the biasing force of the coil spring 85 forming the solenoid 80 or the biasing force of the coil spring 63 and the bellows core 62, the drive rod 83 and the main valve body 51 move rightward in the axial direction, so that the right axial end 51b of the main valve body 51 comes into contact with the left axial end of the fixed core 82, and the step portion 51a of the main valve body 51 separates from the main valve seat 53a, which is formed in the inner diameter portion of the right axial end of the CS valve body 53, to open the main valve 50.

At this time, the biasing force $F_{sp1}$ of the coil spring 85 and the biasing force $F_{bel}$ of the pressure sensitive body 61 (i.e., the biasing force of the bellows core 62 and the coil spring 63) are applied rightward in the axial direction to the main valve body 51 via the drive rod 83 forming the solenoid 80 and from the left axial end 51f, respectively (i.e., with a rightward direction being positive, force $F_{rod}=F_{sp1}+F_{bel}$ is applied to the main valve body 51). Incidentally, the influence of the pressures is omitted due to being small.

In addition, when the capacity control valve V is in a de-energized state, the step portion 51a of the main valve body 51 separates from the main valve seat 53a of the CS valve body 53, and the biasing force $F_{sp2}$ of the coil spring 55 is applied to press the CS valve body 53 rightward in the axial direction, namely, in the valve closing direction of the CS valve 54, so that the outer diameter portion 53b of the right axial end of the CS valve body 53 is seated on the CS valve seat 12a, which is formed in the inner diameter portion of the left axial end of the third valve housing 12, to close the CS valve 54.

Next, an energized state of the capacity control valve V will be described. As illustrated in FIG. 5, when the capacity control valve V is in an energized state (i.e., during normal control, so-called duty control), if electromagnetic force ($F_{sol}1$) generated by the application of a current to the solenoid 80 is greater than the force $F_{rod}$ (i.e., $F_{sol}1>F_{rod}$), since the movable core 84 is pulled toward a fixed core 82 side, namely, leftward in the axial direction, the drive rod 83 fixed to the movable core 84 and the main valve body 51 move together leftward in the axial direction, and the pressure sensitive body 61 is pressed leftward in the axial direction to be contracted, so that the right axial end 51b of the main valve body 51 separates from the left axial end of the fixed core 82, and the step portion 51a of the main valve body 51 is seated on the main valve seat 53a of the CS valve body 53 to close the main valve 50.

At this time, in addition to the electromagnetic force ($F_{sol}1$) toward the left in the axial direction and the force $F_{rod}$ toward the right in the axial direction, the biasing force ($F_{sp2}$) of the coil spring 55 is applied to the main valve body 51 via the CS valve body 53 (i.e., with the rightward direction being positive, force $F_{rod}+F_{sp2}-F_{sol}1$ is applied to the main valve body 51).

During normal control of the capacity control valve V, when the opening degree or opening time of the main valve 50 is adjusted to control the flow rate of the fluid from the Pd port 14 to the Pc port 15, the current value is controlled such that the electromagnetic force $F_{sol}1$ generated by the application of a current to the solenoid 80 is greater than the force $F_{rod}$ (i.e., $F_{sol}1>F_{rod}$) and is less than force $F_{rod}+F_{sp2}$ (i.e., $F_{sol}1<F_{rod}+F_{sp2}$); and thereby the opening and closing of the main valve 50 can be controlled in a state where the closing of the CS valve 54 is maintained.

In addition, when the variable displacement compressor M is driven at the maximum capacity, as illustrated in FIG. 6, the capacity control valve V is brought into a maximum energized state (i.e., energized state at the maximum duty during normal control) to cause electromagnetic force $F_{sol}2$ generated by the application of the maximum current to the solenoid 80 to be greater than the force $F_{rod}+F_{sp2}$ (i.e., $F_{sol}2>F_{rod}+F_{sp2}$), so that the main valve body 51 fixed to the drive rod 83 pushes the CS valve body 53 leftward in the axial direction, and the main valve body 51 moves together with the CS valve body 53 leftward in the axial direction; and thereby, the outer diameter portion 53b of the right axial end of the CS valve body 53 separates from the CS valve seat 12a of the third valve housing 12 to open the CS valve 54. Accordingly, as the drive rod 83 moves while a closed state of the main valve 50 is maintained, the main valve body 51 moves together with the CS valve body 53 to open the CS valve 54, and a Pc-Ps flow passage (illustrated by a solid arrow in FIG. 6) through which the Pc port 15 and the Ps communication passage 16 communicate with each other is formed, namely, the control chamber 4 and the suction chamber 3 communicate with each other, so that the control pressure Pc can be quickly lowered to maintain the control pressure Pc and the suction pressure Ps at equal pressure. Therefore, the capacity control valve V having a high compression efficiency can be provided. In addition, even during startup of the variable displacement compressor M, the capacity control valve V is brought into a maximum energized state to open the CS valve 54 and to allow the Pc port 15 and the Ps communication passage 16 to communicate with each other. Therefore, the capacity control valve V having a good fluid discharge function during startup can be provided.

Figure 7:
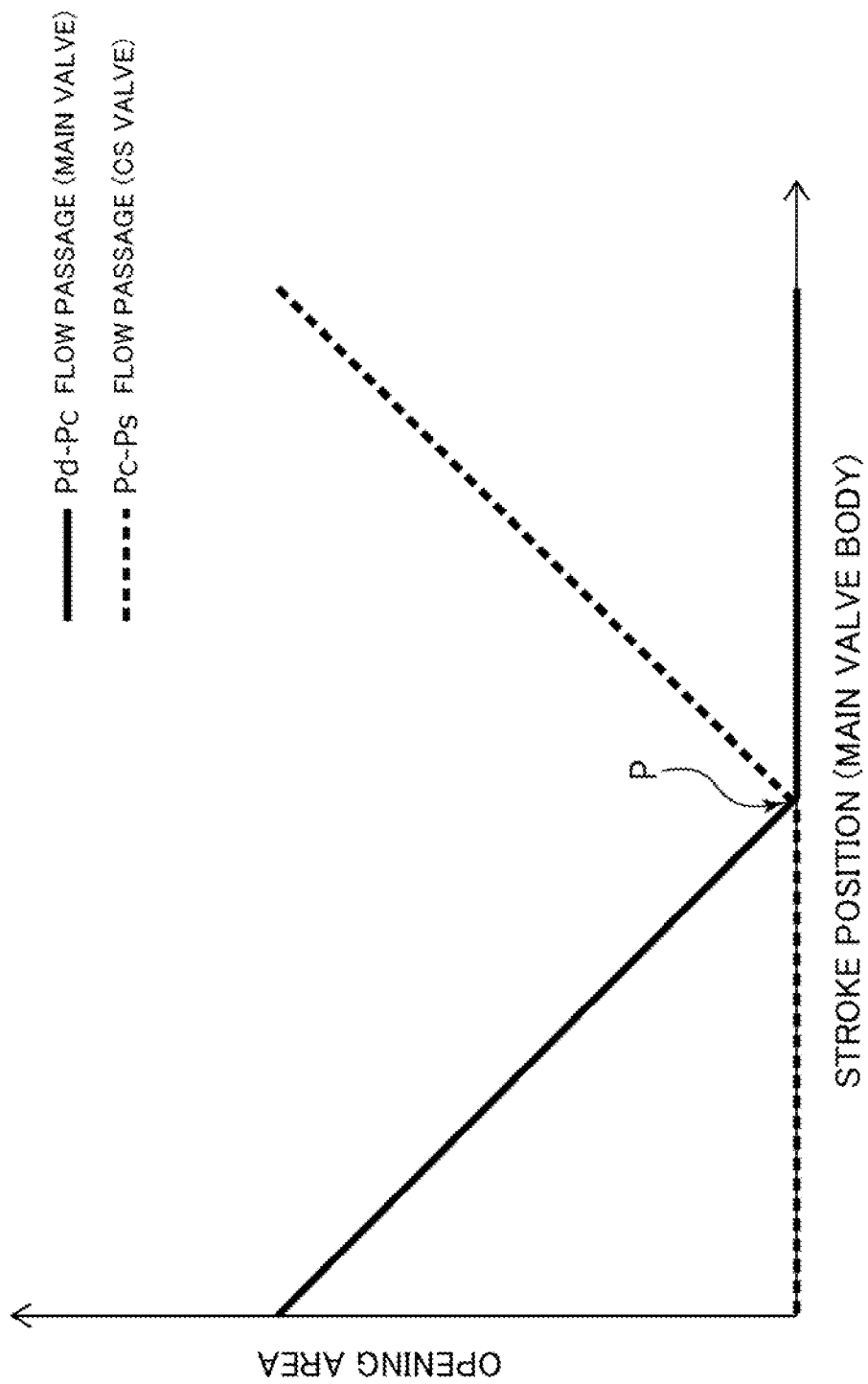
FIG. 7 is a graph describing an open and closed state of the main valve and an open and closed state of the CS valve with respect to the stroke position of a main valve body in the capacity control valve according to the embodiment.

Next, an open and closed state of the main valve 50 and an open and closed state of the CS valve 54 with respect to the stroke position of the main valve body 51 will be described with reference to FIG. 7. Incidentally, the horizontal axis of FIG. 7 represents the stroke position to which the main valve body 51 moves according to a current applied to the solenoid 80. As illustrated in FIG. 7, when the stroke position of the main valve body 51 is 0, which corresponds to when the solenoid 80 is de-energized, the CS valve 54 is closed and the opening area of the main valve 50 is maximized. The opening area of the main valve 50, namely, the Pd-Pc flow passage is linearly reduced according to the stroke position of the main valve body 51, which is dependent on a current applied to the solenoid 80. At this time, the closed state of the CS valve 54 is maintained. When the stroke position of the main valve body 51 reaches a point P, the main valve 50 and the CS valve 54 are closed. Then, when the stroke position of the main valve body 51 passes the point P, the closed state of the main valve 50 is maintained, and the opening area of the CS valve 54, namely, the Pc-Ps flow passage is linearly increased according to the stroke position of the main valve body 51. In such a manner, the switching of opening and closing of the main valve 50 and the CS valve 54 can be performed depending on the stroke position of the main valve body 51 with respect to the point P, and thus the controllability is improved.

In addition, as illustrated in FIGS. 5 and 6, during startup or normal control of the capacity control valve V, when the suction pressure Ps in the pressure sensitive chamber 60 which is applied to the pressure sensitive body 61 is high to cause the force based on the suction pressure Ps to be greater than the biasing force of the bellows core 62 and the coil spring 63 that form the pressure sensitive body 61, due to contraction of the pressure sensitive body 61, the main valve body 51 of which the left axial end 51f is coupled and fixed to the adapter 70 is pulled leftward in the axial direction, and the main valve body 51, the drive rod 83, and the movable core 84 move together leftward in the axial direction against the biasing force of the coil spring 85 forming the solenoid 80, so that the step portion 51a of the main valve body 51 is seated on the main valve seat 53a of the CS valve body 53 to close the main valve 50. In addition, in a state where the main valve 50 is closed, when the suction pressure Ps is further increased to cause the pressure sensitive body 61 to be further contracted, the main valve body 51 is pulled leftward in the axial direction, and the main valve body 51, the drive rod 83, and the movable core 84 move together leftward in the axial direction against the biasing force of the coil spring 85 forming the solenoid 80 and the biasing force of the coil spring 55 which biases the CS valve body 53 rightward in the axial direction, and thus while the closed state of the main valve 50 is maintained, the outer diameter portion 53b of the right axial end of the CS valve body 53 separates from the CS valve seat 12a of the third valve housing 12 to open the CS valve 54. Accordingly, since the pressure sensitive body 61 can be contracted by the high suction pressure Ps to assist the driving force of the solenoid 80, the capacity control valve V having a stable fluid discharge function and compression performance during startup can be provided. In addition, when the capacity control valve V is in a maximum energized state, the opening area of the CS valve 54, namely, the Pc-Ps flow passage which is opened by the electromagnetic force ($F_{sol}2$) generated by the application of the maximum current to the solenoid 80 can be increased.

In addition, since the CS valve body 53 is externally fitted to the main valve body 51, and the main valve seat 53a is formed in the inner diameter portion of the CS valve body 53, the capacity control valve V including the CS valve 54 can be configured more simply and compactly, and the main valve body 51 can move together with the CS valve body 53 while a closed state of the main valve 50 is reliably maintained.

In addition, since the main valve seat 53a forming the main valve 50 is formed in the inner diameter portion of the right axial end that is one end of the CS valve body 53, and the CS valve 54 including the outer diameter portion 53b and the CS valve seat 12a is formed on the outer diameter side thereof, switching between the Pd-Pc flow passage and the Pc-Ps flow passage by the opening and closing of the main valve 50 and the CS valve 54 can be smoothly performed, and thus the responsiveness is good.

In addition, since the CS valve body 53 is biased rightward in the axial direction, namely, in the valve closing direction of the CS valve 54 by the coil spring 55, when the current value is decreased, the CS valve body 53 can reliably move to a closed valve position, and the capacity control valve V can immediately return from the maximum energized state at the maximum duty to a state less energized than the maximum energized state (e.g., in a state of duty control).

In addition, as illustrated in FIG. 3, since the control pressure Pc supplied from the Pc port 15 to the third valve chamber 40 is introduced to a right axial end side that is one end side of the CS valve body 53, and the control pressure Pc supplied to the space S via the supply passage 56 and the through-hole 51e that are formed in the main valve body 51 is introduced to a left axial end side that is the other end side of the CS valve body 53, the control pressures Pc can be applied to the CS valve body 53 from both ends in the axial direction, and the CS valve body 53 can move together with the main valve body 51 in a state where the influence of the pressures is suppressed; and thereby, the valve body can be precisely controlled according to a current applied to the solenoid 80. Furthermore, since an effective area A of the left axial end portion that is the other end portion of the CS valve body 53 is set to be equal to an effective area B of the right axial end portion that is one end portion of the CS valve body 53 (i.e., A=B), the control pressures Pc applied to both ends in the axial direction of the CS valve body 53 are cancelled out, and thus the valve body can be more precisely controlled.

In addition, since the pressure sensitive chamber 60 can be partitioned in a substantially sealed manner inside the first valve housing 10 by the seal member 52 that is externally fitted to the left axial end portion of the main valve body 51 so as to slidable, and the pressure sensitive chamber 60 and the space S can be partitioned off from each other by the seal member 52 and the main valve body 51, the suction pressure Ps can be reliably applied to the pressure sensitive body 61, and the control pressure Pc can be reliably applied to the right axial end portion that is one end portion of the CS valve body 53.

The embodiment of the invention has been described above with reference to the drawings; however, the specific configuration is not limited to the embodiment, and the invention also includes changes or additions that are made without departing from the scope of the invention.

For example, the above embodiment has described a mode where the effective areas A and B of both ends in the axial direction of the CS valve body 53 are set to be equal (i.e., A=B) so that the control pressures Pc applied to both ends in the axial direction of the CS valve body 53 are cancelled out; however, the invention is not limited to the configuration, for example, the effective area A of the left axial end of the CS valve body may be set to be larger than the effective area B of the right axial end of the CS valve body (i.e., A>B), and thus when the main valve 50 is closed, the control pressure Pc is applied rightward in the axial direction, namely, in the valve opening direction to adjust the driving force of the solenoid 80; and thereby, control characteristics of the main valve body 51 are changed. Incidentally, the spring constant of the coil spring 55 may be changed to change the control characteristics of the main valve body 51.

In addition, the disposition in the axial direction of the CS valve body 53 with respect to the main valve body 51, the forming position in the axial direction of the CS valve seat 12a in the third valve housing 12, or the dimensions, shape, or the like of the CS valve body 53 may be changed to appropriately adjust the opening and closing timing of the main valve 50 and the CS valve 54 depending on the stroke position of the main valve body 51 which is based on the driving force of the solenoid 80.

In addition, the above embodiment has described an example where the CS valve 54 is configured such that the CS valve body 53 that moves relative to the main valve body 51 comes into contact with and separates from the CS valve seat 12a of the third valve housing 12; however, other configurations may be adopted, and for example, the CS valve may have a spool valve structure.

In addition, a groove extending in a circumferential direction may be formed in at least one of the outer peripheral surface of the CS valve body 53 and the inner peripheral surfaces of the guide holes 11c and 11d of the second valve housing 11, and accordingly, the sealability of a sliding portion between the CS valve body 53 and the second valve housing 11 is improved by the labyrinth effect of the groove, and thus leakage of the fluid can be suppressed.

In addition, the communication passage through which the control chamber 4 and the suction chamber 3 of the variable displacement compressor M communicate directly with each other, and the fixed orifice may not be provided.

In addition, the first valve housing 10, the second valve housing 11, and the third valve housing 12 that form the valve housing may be integrally formed partially or wholly.

In addition, the above embodiment has described a mode where the control pressure Pc is supplied to the space S via the supply passage 56 and the through-hole 51e that are formed in the main valve body 51; however, the invention is not limited to the configuration, and as long as the control pressure Pc can be introduced to the space S, for example, the valve housing may be provided with a Pc communication passage through which the space S and the third valve chamber 40 communicate with each other. In addition, the valve housing may be provided with a Pc communication passage through which the space S and the control chamber 4 of the variable displacement compressor M communicate directly with each other.

In addition, in the above embodiment, the left axial end 51f of the main valve body 51 is coupled and fixed to the right axial end of the adapter 70 of the pressure sensitive body 61; however, the left axial end 51f of the main valve body 51 and the right axial end of the adapter 70 may be separably coupled to each other, and for example, when the suction pressure Ps is high, since the main valve body 51 can separate from the adapter 70 due to contraction of the pressure sensitive body 61, the main valve 50 can be reliably opened when the capacity control valve V is in a de-energized state. Incidentally, the stroke end of the main valve body 51 when the pressure sensitive body 61 is in a contracted state is determined by a stroke position where the left axial end portion of the movable core 84 forming the solenoid 80 comes into contact with the right axial end portion of the fixed core 82.

In addition, instead that the coil spring is used inside the pressure sensitive body 61, the bellows core 62 may have biasing force.

REFERENCE SIGNS LIST

1 Casing
2 Discharge chamber
3 Suction chamber
4 Control chamber
10 First valve housing (valve housing)
11 Second valve housing (valve housing)
12 Third valve housing (valve housing)

12a CS valve seat
13 Ps port (suction port)
14 Pd port (discharge port)
15 Pc port (control port)
16 Ps communication passage
20 First valve chamber
30 Second valve chamber
40 Third valve chamber
50 Main valve
51 Main valve body
51a Step portion
52 Seal member
53 CS valve body
53a Main valve seat
53b Outer diameter portion
54 CS valve
55 Coil spring (biasing means)
56 Supply passage
60 Pressure sensitive chamber (suction fluid supply chamber)
61 Pressure sensitive body (pressure drive unit)
62 Bellows core
63 Coil spring
70 Adapter
80 Solenoid
83 Drive rod (rod)
84 Movable core
85 Coil spring
Pc Control pressure
Pd Discharge pressure
Ps Suction pressure
S Space
V Capacity control valve

The invention claimed is:

1. A capacity control valve comprising:
a valve housing provided with a discharge port through which a discharge fluid at a discharge pressure passes, a suction port through which a suction fluid at a suction pressure passes, and a control port through which a control fluid at a control pressure passes;
a rod driven by a solenoid;
a main valve that includes a main valve seat and a main valve body to open and close a communication between the discharge port and the control port in accordance with a movement of the rod;
a pressure drive unit disposed in a suction fluid supply chamber which is formed in the valve housing and to which the suction fluid is supplied, the pressure drive unit being operated by the suction pressure and coupled to the main valve body so as to be movable together; and
a CS valve that includes a CS valve seat and a CS valve body to open and close a communication between the control port and the suction port, the CS valve body being disposed so as to be movable relative to the main valve body,
wherein
upon the movement of the rod moves in a closed state of the main valve, the main valve body and the CS valve body move together.

2. The capacity control valve according to claim 1, wherein the CS valve body is externally fitted to the main valve body, and the main valve seat is formed in an inner diameter portion of the CS valve body.

3. The capacity control valve according to claim 2, wherein the main valve seat is formed at one end of the CS valve body, and the CS valve seat is formed on an outer diameter side of the main valve seat.

4. The capacity control valve according to claim 2, wherein the CS valve body is biased in a valve closing direction of the CS valve by a spring.

5. The capacity control valve according to claim 2, wherein the control fluid from the control port is introduced to a first end side and a second end side of the CS valve body in an axial direction.

6. The capacity control valve according to claim 5, wherein the control fluid from the control port is introduced to the first end side of the CS valve body, and the control fluid from the control port is introduced to the second end side of the CS valve body via a supply passage formed in the main valve body.

7. The capacity control valve according to claim 6, wherein effective areas of both end portions of the CS valve body are equal.

8. The capacity control valve according to claim 2, wherein the suction fluid supply chamber is partitioned inside the valve housing by a seal member that is externally fitted to the main valve body so as to be slidable.

9. The capacity control valve according to claim 3, wherein the CS valve body is biased in a valve closing direction of the CS valve by a spring.

10. The capacity control valve according to claim 3, wherein the control fluid from the control port is introduced to a first end side and a second end side of the CS valve body in an axial direction.

11. The capacity control valve according to claim 10, wherein the control fluid from the control port is introduced to the first end side of the CS valve body, and the control fluid from the control port is introduced to the second end side of the CS valve body via a supply passage formed in the main valve body.

12. The capacity control valve according to claim 11, wherein effective areas of both end portions of the CS valve body are equal.

13. The capacity control valve according to claim 3, wherein the suction fluid supply chamber is partitioned inside the valve housing by a seal member that is externally fitted to the main valve body so as to be slidable.

14. The capacity control valve according to claim 1, wherein the CS valve body is biased in a valve closing direction of the CS valve by a spring.

15. The capacity control valve according to claim 14, wherein the control fluid from the control port is introduced to a first end side and a second end side of the CS valve body in an axial direction.

16. The capacity control valve according to claim 15, wherein the control fluid from the control port is introduced to the first end side of the CS valve body, and the control fluid from the control port is introduced to the second end side of the CS valve body via a supply passage formed in the main valve body.

17. The capacity control valve according to claim 1, wherein the control fluid from the control port is introduced to a first end side and a second end side of the CS valve body in an axial direction.

18. The capacity control valve according to claim 17, wherein the control fluid from the control port is introduced to the first end side of the CS valve body, and the control fluid from the control port is introduced to the second end side of the CS valve body via a supply passage formed in the main valve body.

19. The capacity control valve according to claim 18, wherein effective areas of both end portions of the CS valve body are equal.

20. The capacity control valve according to claim 1, wherein the suction fluid supply chamber is partitioned inside the valve housing by a seal member that is externally fitted to the main valve body so as to be slidable.

* * * * *